United States Patent
Yoshimura et al.

(10) Patent No.: US 9,731,394 B2
(45) Date of Patent: Aug. 15, 2017

(54) MACHINING METHOD FOR A THREADED SECTION AND MACHINING DEVICE

(71) Applicant: NSK LTD., Tokyo (JP)

(72) Inventors: Takashi Yoshimura, Kanagawa (JP); Yoshiteru Kondo, Gunma (JP)

(73) Assignee: NSK LTD., Tokyo (JP)

(*) Notice: Subject to any disclaimer, the term of this patent is extended or adjusted under 35 U.S.C. 154(b) by 29 days.

(21) Appl. No.: 14/768,918

(22) PCT Filed: Feb. 6, 2014

(86) PCT No.: PCT/JP2014/052793
§ 371 (c)(1),
(2) Date: Aug. 19, 2015

(87) PCT Pub. No.: WO2014/129314
PCT Pub. Date: Aug. 28, 2014

(65) Prior Publication Data
US 2016/0008940 A1 Jan. 14, 2016

(30) Foreign Application Priority Data
Feb. 20, 2013 (JP) .................................. 2013-030592

(51) Int. Cl.
*B23Q 15/02* (2006.01)
*B23G 1/02* (2006.01)
(Continued)

(52) U.S. Cl.
CPC .............. *B23Q 15/02* (2013.01); *B23G 1/02* (2013.01); *B23Q 17/20* (2013.01); *G05B 19/404* (2013.01);
(Continued)

(58) Field of Classification Search
CPC ........ G05B 19/404; G05B 2219/49217; G05B 2219/49219; B23G 1/02; B23Q 15/02; B23Q 17/20
See application file for complete search history.

(56) References Cited

U.S. PATENT DOCUMENTS 2,079,954 A * 5/1937 Vosper ..................... B23G 5/04
408/105
3,937,110 A * 2/1976 Renoux ..................... B23B 3/06
82/117
(Continued)

FOREIGN PATENT DOCUMENTS

EP        870574 A1    10/1998
JP     62-228322 A    10/1987
(Continued)

OTHER PUBLICATIONS

International Search Report and Written Opinion dated Mar. 18, 2014, from the corresponding PCT/JP2014/052793.

*Primary Examiner* — Sara Addisu
(74) *Attorney, Agent, or Firm* — Katten Muchin Rosenman LLP (57) ABSTRACT

The present invention prevents the occurrence of variation in the lead of a threaded section of a machined article (19*a*) resulting from the effects of thermal expansion of the machined article (19*a*) during machining. A thermal expansion amount that relates to the axial direction of the machined article (19*a*) during machining is measured by measurement means (13), history information for the thermal expansion amount that relates to the machined article (19*a*) during machining is obtained from the result of the aforementioned measurement, and a control unit (17*a*) determines the relative rotational speed of a rotary drive shaft (11) or the feeding speed of an axial feeding device (16*a*) with respect to the next machined object (19*a*) that is (Continued)

to be machined on the basis of the history information for the thermal expansion amount of the machined object (19a) that has been machined.

4 Claims, 5 Drawing Sheets

(51) Int. Cl.
*G05B 19/404* (2006.01)
*B23Q 17/20* (2006.01)

(52) U.S. Cl.
CPC .............. *G05B 2219/49217* (2013.01); *G05B 2219/49219* (2013.01)

(56) References Cited

U.S. PATENT DOCUMENTS

| | | | |
|---|---|---|---|
| 5,076,744 A * | 12/1991 | Kitagawa | B23G 1/34 409/66 |
| 5,910,199 A * | 6/1999 | Busick | B23G 1/04 82/1.11 |
| 6,606,535 B1 * | 8/2003 | Hamamura | G05B 19/4083 700/159 |
| 6,615,697 B2 * | 9/2003 | Nakagawa | B23Q 15/007 409/147 |
| 6,629,480 B1 * | 10/2003 | Freyermuth | B23P 11/027 33/201 |
| 7,140,812 B2 * | 11/2006 | Bryan | B29C 59/022 29/557 |
| 8,234,958 B2 * | 8/2012 | Hyatt | B23B 1/00 82/118 |
| 8,534,169 B2 * | 9/2013 | Miyamoto | B23B 5/08 700/195 |
| 8,589,103 B2 * | 11/2013 | Matsubara | B23Q 17/20 702/66 |
| 8,631,727 B2 * | 1/2014 | Nakagawa | B23Q 11/0007 33/626 |
| 8,845,247 B2 * | 9/2014 | Wu | B23Q 15/18 409/186 |
| 2006/0089745 A1 * | 4/2006 | Suzuki | G05B 19/404 700/176 |
| 2009/0007082 A1 * | 1/2009 | Nebel | G05B 19/4083 717/139 |
| 2014/0156056 A1 * | 6/2014 | Kotake | G05B 19/404 700/174 |
| 2015/0112503 A1 * | 4/2015 | Matsumoto | G05B 15/02 700/299 |
| 2016/0224010 A1 * | 8/2016 | Qi | G05B 19/404 |

FOREIGN PATENT DOCUMENTS

| | | |
|---|---|---|
| JP | 09-323218 A | 12/1997 |
| JP | 10-286742 A | 10/1998 |
| JP | 2001-277084 A | 10/2001 |
| JP | 2009-072841 A | 4/2009 |
| JP | 2010-42483 A | 2/2010 |

* cited by examiner

PRIOR ART

MACHINING METHOD FOR A THREADED SECTION AND MACHINING DEVICE

TECHNICAL FIELD

The present invention relates to a machining method for a threaded section and a machining device for forming a threaded section (helical structure) on a rod shaped or tubular shaped machined article.

BACKGROUND ART

Power steering apparatuses are widely used as an apparatus for reducing the force required for operating a steering wheel when applying a steering angle to the steered wheels of a vehicle. Electric-powered power steering apparatuses that use an electric motor as an auxiliary power source are already widespread. Reduction gears are assembled in such electric-powered power-steering apparatuses, and worm reduction gears having a large lead angle and having reversibility in the power transmission direction are typically used for this kind of reduction gear.

Figure 4:
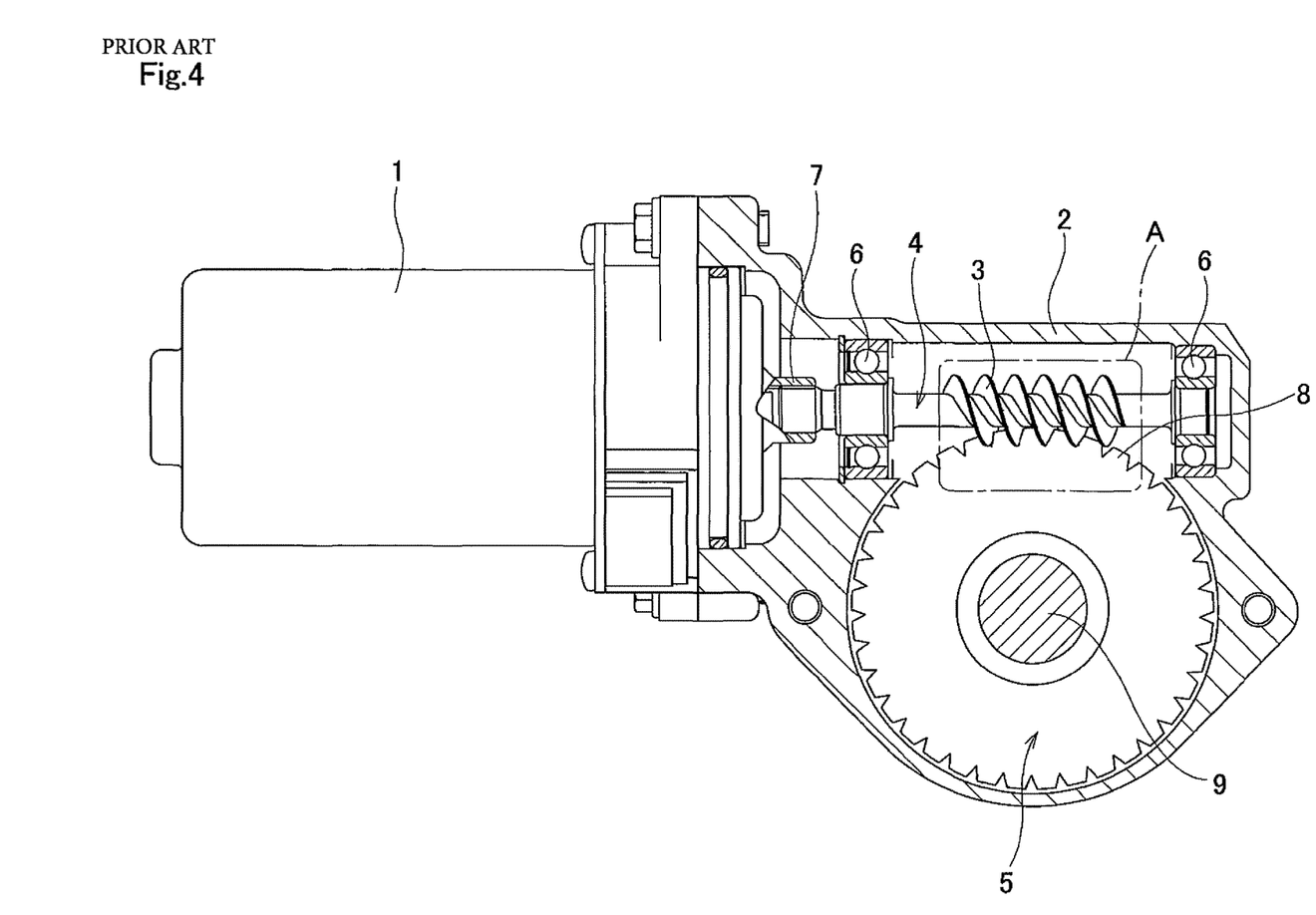
FIG. 4 is s cross-sectional view of a portion of a power-steering apparatus where the worm reduction gear is assembled.
Figure 5:
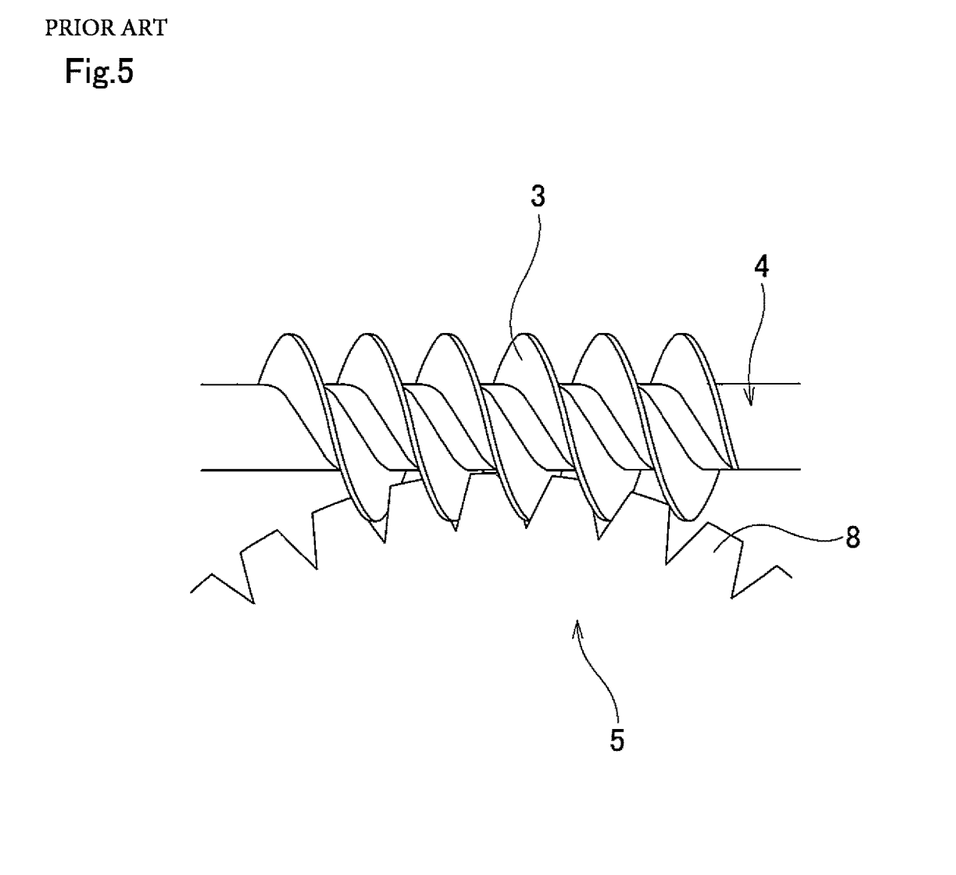
FIG. 5 is an enlarged view of section A in FIG. 4.

FIG. 4 and FIG. 5 illustrate an example of a conventional worm reduction gear as disclosed in JP 2009-072841 (A). This worm reduction gear has: a worm 4 that is fastened to an electric motor 1, is located on the inside of a housing 2 for the worm reduction gear, and has a worm tooth 3 formed around the middle section in the axial direction of the worm 4; and a worm wheel 5 that engages with the worm tooth 3. The worm 4 is supported by a pair of ball bearings that fit around both end sections in the axial direction so as to be able to freely rotate inside the housing 2, one end of the worm 4 (left end in FIG. 4) is connected to the output shaft 7 of the electric motor 1, and the worm 4 is rotated and driven by the electric motor 1.

The worm wheel 5 is located inside the housing 2 so as to rotate freely and so that the center axis of rotation of the worm wheel 5 is in a skewed position with respect to the worm 4. The tooth section 8 that is formed around an outer circumferential edge portion of the worm wheel 5 and the worm tooth 3 engage and make it possible to transmit torque between the worm 4 and worm wheel 5. The worm wheel 5 is fastened around the outside of the middle section of the steering shaft 9. With this kind of construction, the rotational driving force that is generated by the electric motor 1 can be transmitted to the steering shaft 9 by way of the worm 4 and worm wheel 5.

The threaded section (helical structure) of the worm tooth of this kind of worm is formed by performing a cutting process or grinding process on the outer circumferential surface or inner circumferential surface of a rod-shaped object or tubular-shaped object. As this kind of threaded section, instead of the worm tooth of a worm, there is also the ball-screw groove of the ball-screw shaft of a ball-screw device, the female screw section of a nut and the like.

Figure 6:
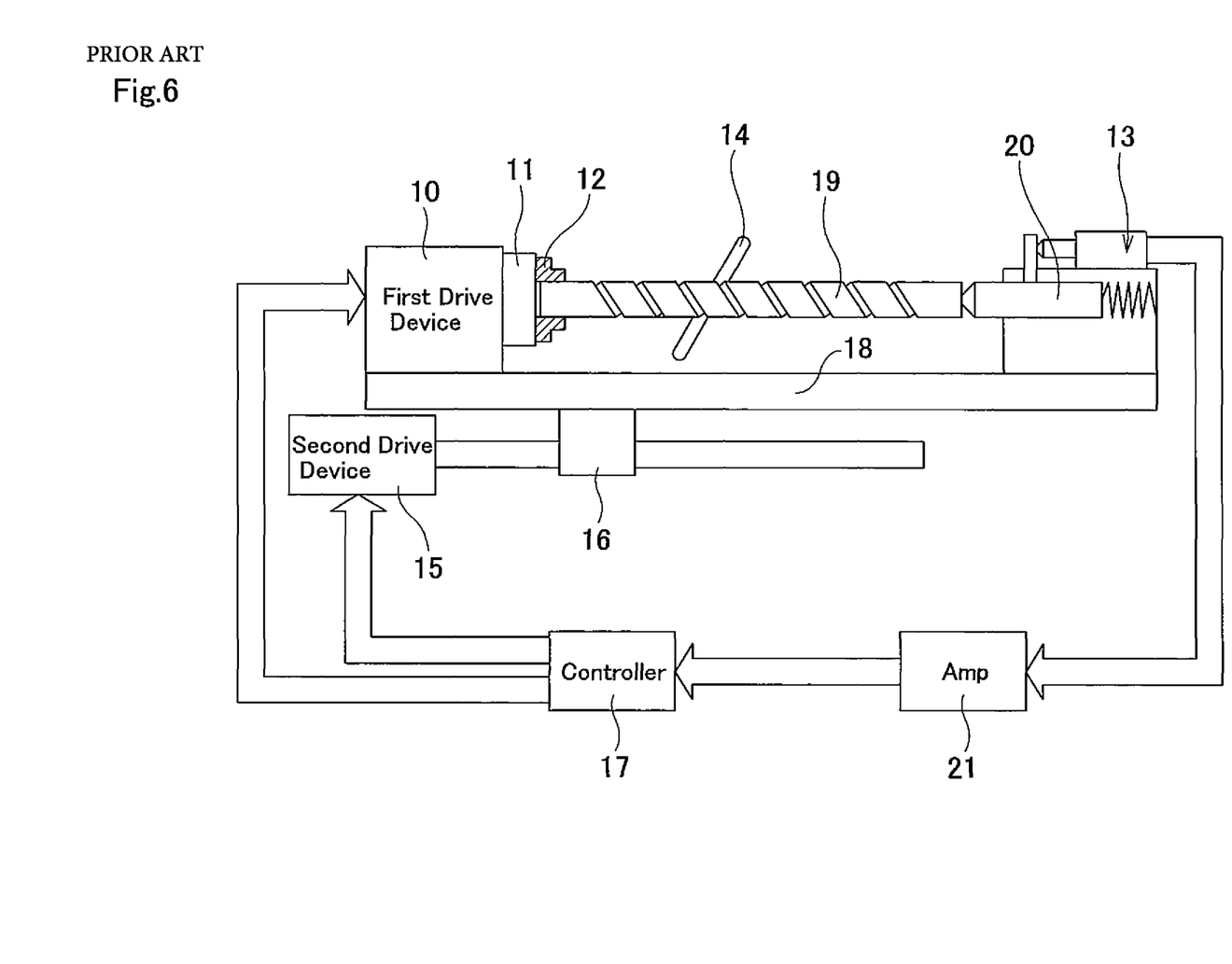
FIG. 6 schematically illustrates an example of a conventional grinding device for forming a threaded section around the outer-circumferential surface of a rod-shaped member.

FIG. 6 illustrates an example of a conventional threaded section grinding device for forming a screw groove on the outer-circumferential surface of a rod-shaped member as disclosed in JP H09-323218 (A). This grinding device has a first drive device 10, a rotary drive shaft 11, a grip section 12, measurement means 13, a machine tool 14, a second drive device 15, an axial feeding device 16 and a controller 17.

The first drive device 10 has a servo motor, and is mounted on one side of the top surface of a feeding table 18. The feeding table 18 is provided so as to be able to be displaced in the axial direction of a machined article 19 by the axial feeding device 16. Unless stated otherwise, the axial direction is the axial direction of the machined article. The rotary drive shaft 11 is rotated and driven by the first drive device 10. The grip section 12 is provided on the tip end of the rotary drive shaft 11, and one end of the machined article 19 can be concentrically fastened to the rotary drive shaft 11 so as to be able to integrally rotate with the rotary drive shaft 11.

The measurement means 13 is located on the other side of the top surface of the feeding table 18. The measurement means 13 has a tailstock 20, and is constructed so as to measure the amount of thermal expansion in the axial direction of the machined article 19 that is being machined in a state that the tip end of the tailstock 20 is in contact with the other end of the machined article 19. The detailed construction of the measurement means 13 is known, such as disclosed in JP H9-323218 (A), so an explanation thereof will be omitted.

The machine tool 14 has a grindstone and is used for machining the outer-circumferential surface of the machined article 19. The second drive device 15 has a servo motor, and drives the axial feeding device 16. The axial feeding device 16 has a feed-screw mechanism, and by being driven by the second drive device 15, causes the feeding table 18 to move in the axial direction. By the feeding table 18 being displaced in the axial direction in this way, it is possible for the machine tool 14 to move relative to the machined article 19 in the axial direction. Furthermore, the controller 17 controls the rotational speed of the rotary drive shaft 11 and the feeding speed of the axial feeding device 16, or in other words controls the speed of relative displacement in the axial direction between the machine tool 14 and the machined article 19 by controlling the first drive device 10 and the second drive device 15.

This kind of grinding device is able to form a screw groove on the outer-circumferential surface of a machined article 19 by causing the first drive device 10 to rotate the rotary drive shaft 11 and the machined article 19 and causing the second drive device 15 to cause relative displacement between the machine tool 14 and machined article 19.

When machining a threaded section using this kind of grinding device, the machined article 19 undergoes thermal expansion as the temperature of the article 19 being machined increases. This kind of thermal expansion causes variations to occur in the lead of the threaded section that is formed on the machined article 19. More specifically, when machining is performed with a constant rotational speed of the machined article 19 with respect to the machine tool 14 and constant feeding speed in the axial direction of the machined article 19 and the lead of the threaded section that is formed during the first half of machining is compared with the lead of the threaded section that is formed during the latter half of machining, the lead of the threaded section that is formed during the latter half when the amount of thermal expansion is large becomes small. In other words, a threaded section that is formed on a fixed lead regardless of whether the amount of thermal expansion is large or small is such that the thermal expansion is constricted and decreases the more the lead section of the threaded section is formed on a portion where the amount of thermal expansion is large.

On the other hand, this grinding device is constructed so as to send a signal indicating the amount of thermal expansion of the machined article 19 that was measured by the measurement means 13 during machining to the controller 17 by way of an amp 21, and so that the controller 17 calculates a correction value for the drive force of the first drive device 10 (rotational speed of the rotary drive shaft 11)

and the drive force of the second drive device 15 (feeding speed of the axial feeding device 16) based on information that was sent from the measurement means 13, and sends a new instruction (amount of drive) that was calculated based on the correction values to the first drive device 10 and second drive device 15. With this kind of construction, it is possible to correct the machining conditions for machining the machined article 19 in real-time based on the amount of thermal expansion of the machined article 19 that was measured during machining, so variation of the lead of the threaded section that is formed on the machined articles 19 is prevented.

This grinding device is effective in keeping the lead of the threaded section that is formed around the outer circumferential surface of the machined article having a long overall length and long machining time as in the case of a ball-screw rod from becoming different during the first half of machining and the latter half of machining, however, when machining a machined article having a short overall length and short machining time, there is a possibility that feedback control will not always be performed effectively and stably. For example, in the case of a machined article having a relatively short dimension in the axial direction, and short machining time, such as in the case of a worm, it is necessary to perform highly precise feedback control at high speed in order to keep the amount of difference in the lead of the threaded section that is formed around the outer-circumferential surface of the machined article during the first half and the latter half of machining of this machined article small.

However, in the case of feedback control in real-time of a machined article having a short machining time such as this, error in the measurement value for feedback control, or noise that is mixed in with that measurement value has a large effect on the machining conditions, and it may become difficult to perform effective feedback control. Therefore, in order to obtain a suitable effect from this kind of feedback control, expensive equipment (measurement device, CPU of a controller, drive devices and the like) is necessary. Moreover, the machining device illustrated in FIG. 6 is a grinding device, however, in the case of machining device for performing cutting device, the machining speed is faster than in grinding device, so the machining time for each machined article becomes short, and there is a possibility that the same problem will occur. Therefore, in the case of a machining device for performing cutting as well, expensive equipment is necessary in order to perform feedback control effectively and stably.

RELATED LITERATURE

Patent Literature

[Patent Literature 1] JP 2009-072841 (A)
[Patent Literature 2] JP H9-323218 (A)

SUMMARY OF INVENTION

Problem to be Solved by Invention

Taking the situation above into consideration, the object of the present invention is to provide at low cost machining method for a threaded section and a machining device that is able to prevent variation in the lead of a threaded section of each machined article due to the effect of thermal expansion of the machined article during machining, even when performing machining having a short machining time.

Means for Solving Problems

The threaded section machining method of the present invention is a machining method for forming a threaded section on the outer-circumferential surface or inner-circumferential surface of a rod-shaped or tubular shaped machined article by causing relative rotation and relative displacement in the axial direction between the machined article and a machine tool. Particularly, the threaded section machining method of the present invention comprises steps of measuring the amount of thermal expansion in the axial direction of machined articles during machining by measurement means; obtaining history information for the amount of thermal expansion of machined articles during machining from the measurement results; and setting the speed of relative rotation or the speed of relative displacement for a machined article to be machined next based on the history information for the amount of thermal expansion.

Additionally, it is preferred that the threaded section machining method of the present invention further comprise a step of determining the state of a machine tool being used by comparing the correlation between the history information for the amount of thermal expansion of completed machined articles and the time, and the amount of thermal expansion of a machined article being machined. Here, the correlation has an approximation straight light that is calculated from the relationship between the amount of thermal expansion of machined articles that were machined in the past and the time. This kind of approximation straight line is found by an approximation method such as a least-squares method based on the relationship between the amount of thermal expansion of machined articles and the time. Moreover, the time is not only the machining time, but also includes the number of machinings.

The threaded section machining device of the present invention comprises:
  a rotary drive shaft that is rotated and driven by a first drive device;
  a grip section for concentrically fastening one end of a rod-shaped or tubular-shaped machined article to the rotary drive shaft so as to be able to integrally rotate with the rotary drive shaft;
  a measurement means for measuring the amount of thermal expansion in the axial direction of the machined article;
  a machine tool for machining the machined article;
  an axial feeding device that is driven by a second drive device and is for causing relative displacement in the axial direction between the machine tool and the machined article; and
  a controller for controlling the rotational speed of the rotary drive shaft or the feeding speed of the axial feeding device;
  the threaded section machining device forming a threaded section around the outer-circumferential surface or inner-circumferential surface of a machined article by causing the machined article to rotate by rotating the rotary drive shaft, and causing the machine tool to move in the axial direction relative to the machined article.

Particularly, in the threaded section machining device of the present invention, the controller obtains history information for the amount of thermal expansion of the machined article being machined from the measurement results, and sets the speed of relative rotation or speed of relative displacement for the machined article to be machined next based on the history information for the amount of thermal expansion. Preferably, the threaded section machining device of the present invention further comprises a memory device for storing history information for the amount of thermal expansion of the machined articles.

Additionally, it is preferred that the controller determine the state of the machine tool being used by comparing the correlation between the history information for the amount of thermal expansion of completed machined articles and the time, with the amount of thermal expansion of the machined article being machined.

Effect of Invention

With the threaded section machining method and machining device of the present invention, it is possible to achieve low-cost construction that is able to prevent the occurrence of variation in the lead of the threaded section that is formed on a machined article due to thermal expansion of a machined article that is being machined even when performing machining in which the machining time becomes short. In other words, with the present invention, the machining conditions for the next machined article (rotational speed of the machined article, or the speed of relative displacement in the axial direction of the machined article and the machine tool) are set based on history information for the thermal expansion of machined articles that were measured during machining.

More specifically, the rotational speed or the speed of relative displacement is corrected so that the lead of the formed threaded section after thermal expansion has settled does not become too small when compared with the target lead even as the wear of the machine tool advances and the amount of thermal expansion of the machined article becomes large. The correction value is calculated based on the history information in this way, and this correction value is reflected on the machining conditions for the next machined article, so the occurrence of variation in the lead of the threaded section in the first half and latter half of machining for each machined article, and furthermore, between machined articles is further prevented by performing the next machining under preset machining conditions even when performing machining in which the machining time is short. Moreover, the next machining is performed under preset machining conditions, so differing from the case of real-time feedback control, the machining conditions are not affected by error in the measurement value for feedback control, or by noise that is mixed in the measurement value. As a result, there is no need for fast and highly precise control, and thus it is possible to reduce the equipment costs and machining costs.

MODES FOR CARRYING OUT INVENTION

Figure 1:
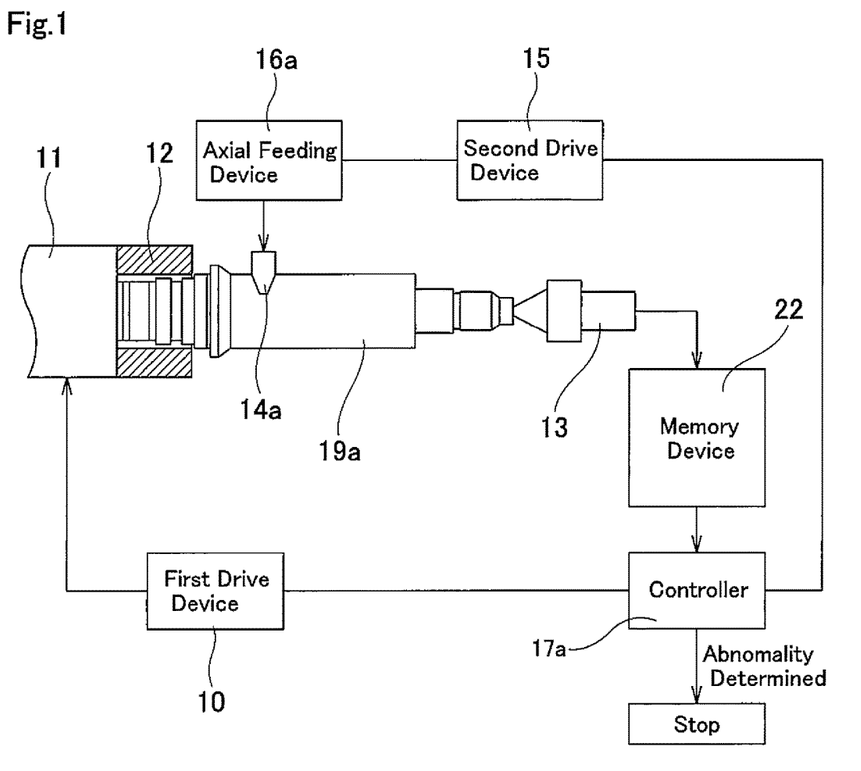
FIG. 1 schematically illustrates the construction of a threaded section machining device of an example of an embodiment of the present invention.

FIG. 1 illustrates an example of an embodiment of the present invention. A feature of the present invention, including this example, is measuring the thermal expansion that occurs in a rod-shaped or tubular-shaped machined article 19a that is being machined, and setting machining conditions for machining the next machined article 19a based on the history information for the amount of thermal expansion of the machined article 19a that was obtained from the measurement results. The machining method and other construction of the machining device are the same as the conventional machining method and machining device, so explanations of identical parts are omitted or simplified, and the explanation below will center on the features of this example.

The threaded section machining device of this example has: a first drive device 10; a rotary drive shaft 11 that is rotated and driven by the first drive device 10; a grip section 12 for concentrically fastening one end of the machined article 19a to the rotary drive shaft 11 so as to be able to integrally rotate with the rotary drive shaft 11; measurement means for measuring the amount of thermal expansion in the axial direction of the machined article 19a; a machine tool 14a for performing machining of the machined article 19a; a second drive device 15; an axial feeding device 16a that is driven by the second drive device 15 and causes relative displacement in the axial direction between the machine tool 14a and the machined article 19a; and a controller 17a for controlling the rotational speed of the rotary drive shaft 11 or the feeding speed of the axial feeding device 16a. In this example, the machine tool 14a is a cutting tool, and the threaded machining device of this example, is for cutting machining. However, the present invention can also be applied to a threaded machining device for grinding machining as well.

The threaded section machining device of this example has a memory device 22 (memory) for storing the amount of thermal expansion in the axial direction of a measured article 19a that was measured during machining when forming the threaded section around the outer-circumferential surface or inner-circumferential surface of the machined articles 19a, in a state in which by causing the rotary drive shaft 11 to rotate, the machined article 19a was caused to rotate, and relative displacement in the axial direction was caused between the machine tool 14a and the machined article 19a. A function (machining condition setting function) for setting machining conditions for machining the next machined article 19a to be machined based on history information about the amount of thermal expansion of the measured articles 19a that is stored in the memory device 22 is assembled in the controller 17a. The machining conditions are one or both of the rotational speed of the rotary drive shaft 11 (drive force of the first drive device 10), and the feeding speed of the axial feeding device 16a (drive force of the second drive device 15).

Figure 2:
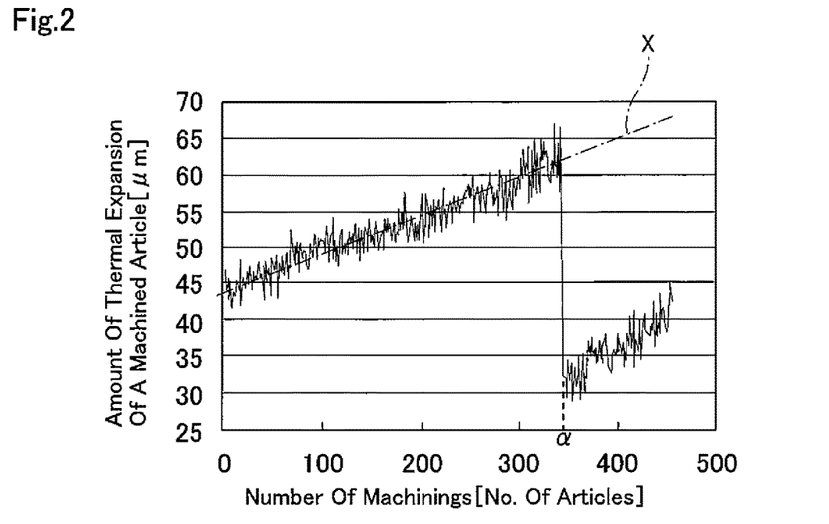
FIG. 2 is a graph illustrating the relationship between the amount of thermal expansion of a machined article and the number of machinings by the same machine tool

The method for setting machining conditions by this kind of machining condition setting function will be explained. FIG. 2 illustrates the relationship between the amount of thermal expansion during machining of plural machined articles 19a and the number of machinings (machining time) when machining is performed on plural machined articles 19a using the same machine tool 14a. The amount of thermal expansion during machining of the machined article 19a is the difference between the dimensions in the axial direction of the machined article 19a before the start of machining (in a state in which there is no thermal expansion) and at the end of machining (in a state in which the temperature of the machined article 19a has not dropped). Moreover, the reason for the large drop in the amount of thermal expansion of the machined article 19a at point a in FIG. 2 is that the machine tool 14a was replaced with a new machine tool 14a. As can be clearly seen from FIG. 2, when performing machining plural times using the same machine tool 14a, the amount of thermal expansion during machining of the machined article 14a increases as the number of machinings (machining time) increases. This is due to an increase in the machining temperature that occurs as the sharpness or cutting ability of the machine tool 14a decreases. In FIG. 2, the reason a difference occurs in the amount of thermal expansion of the machined article at the point when there is a small number of machinings by the machine tool before being exchanged, and the amount of thermal expansion of the machined article at the point when there is a small number of machinings by the machine tool after being exchanged is due to individual differences in each machine tool such as the original sharpness or cutting ability.

As can be seen from FIG. 2, the amount of thermal expansion of the machined article 19a and the number of machinings, even though there is a little variation, have a large tendency to have a proportional relationship. Therefore, by finding the proportional relationship (correlation) between the amount of thermal expansion of the machined article 19a and the number of machinings, it is possible to predict the amount of thermal expansion of the machined article 19a of the next process based on this proportional relationship. More specifically, an approximation straight line such as illustrated by the chain line in FIG. 2 is found by an approximation method such as a method of least squares. By finding this kind of approximation straight line, the amount of thermal expansion of the machined article 19a of the next process is predicted. The controller 17a sets machining conditions for the next process based on the estimated amount of thermal expansion for the machined article 19a.

Moreover, the threaded section machining device of this example has a function for determining the state of the machine tool 14a that is used by comparing the approximation straight line (refer to the chain line X in FIG. 2), which is calculated based on the relationship between the history information for the amount of thermal expansion of the machined articles 19a and the number of machinings (machining time), and the amount of thermal expansion of the machined article 19a being machined. More specifically, the controller 17a determines that the machine tool 14a has reached its life according to the advancement of wear when the measured amount of thermal expansion of the machined article 19a being machined has greatly deviated beyond a specified amount from the approximation line. The control that performs such a judgment can be performed either at the end of machining or during machining of the machined article 19a. When performing this control during machining, control is performed by stopping machining at the instant that abnormality in the machine tool 14 is sensed. By using construction such as this, it is possible to more quickly sense abnormality of the machine tool 14a.

In the threaded section machining method of this example, the amount of thermal expansion in the axial direction during machining of the machined article 19a is measured by way of the measurement means 13, and the measurement result is stored in the memory device 22. Then, history information for the amount of thermal expansion of the machined articles 19a is obtained from the measurement results, and based on the history information for the amount of thermal expansion, machining conditions (rotational speed of the machined article, or speed of relative displacement in the axial direction of the machined article 19a and the machine tool 14a) are set for the machined article 19a to be machined next. More specifically, as wear of the machine tool 14a advances and it is predicted that the amount of thermal expansion of the machined article 19a to be machined next will become larger, the controller 17a corrects the rotational speed of the rotary drive shaft 11, or the feeding speed of the axial feeding device 16a so that the lead of the threaded section that is formed on the next machined article 19a does not become too small compared with the target lead after the thermal expansion has settled (undergone thermal contraction).

With the threaded section machining method and machining device of this example, the occurrence of variation in the lead of the threaded section that is formed due to the effect of thermal expansion during machining of the machined article 19a is prevented even when machining is performed in which the machining time becomes shorter. In this example, machining conditions for the next machined article 19a are set based on history information for the amount of thermal expansion of the machined article 19a. Therefore, the occurrence of variation in the lead of the threaded section between the first half and the latter half for each machined article 19a, and furthermore, between machined articles 19a is prevented by performing the next machining under preset machining conditions even when performing machining in which the machining time becomes short.

Figure 3:
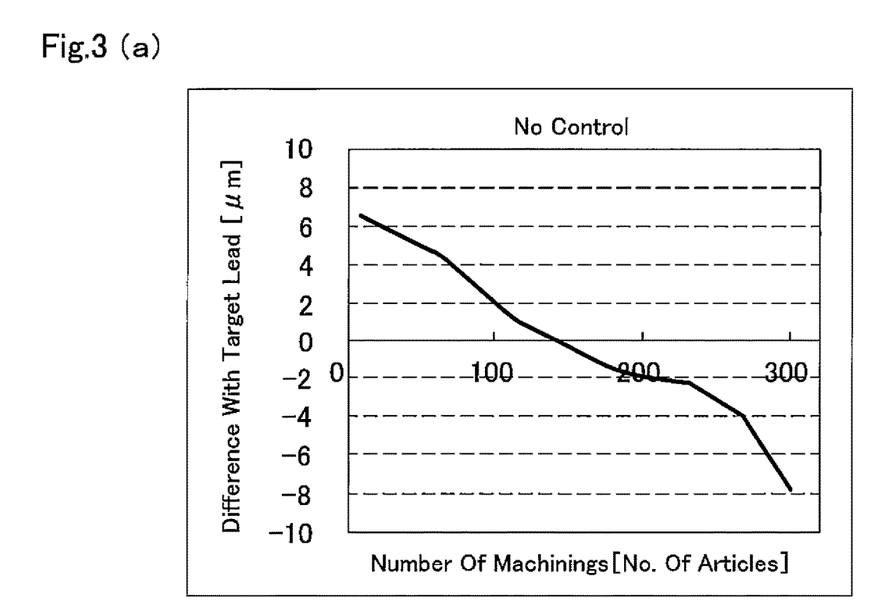
FIG. 3A is a graph illustrating the relationship between the difference in the lead of a threaded section that was formed without performing the control of the present invention and the target lead, and the number of machinings by the same machine tool.
FIG. 3B is a graph illustrating the relationship between the difference in the lead of a threaded section that was formed with performing the control of the present invention and the target lead, and the number of machinings by the same machine tool.

FIG. 3A and FIG. 3B illustrate the results for tests that were performed for confirming the effect of the present invention. FIG. 3A illustrates the relationship between the difference in the lead of the threaded section that is actually formed with respect to the target lead and the number of machinings when performing machining of plural machined articles using one machine tool under fixed machining conditions when the present invention is not applied. As can be seen from FIG. 3A, when the number of machinings is small, the lead of the threaded section becomes large with respect to the target lead, however, as the number of machinings increases, the lead of the threaded section becomes small with respect to the target lead. This is because the fixed machining conditions are set by assuming a certain amount of thermal expansion of the machined article. Therefore, when the actual amount of thermal expansion of the machined articles is less than the assumed amount of thermal expansion, or greater than the assumed amount of thermal expansion, the difference between the lead of the threaded section and the target lead becomes large. In the case of the machined article that is obtained by the machining method illustrated in FIG. 3A when the present invention is not applied, presuming that the allowable error is set to be within the range −3 μm to +3 μm, machined articles that are outside this range and for which the number of machinings is within the range of approximately 80 or less and approximately 250 or more are handled as defective parts.

On the other hand, FIG. 3B illustrates the relationship between the difference of the lead of a threaded section that is actually formed with respect to the target lead when machining of plural machined articles is performed using one machine tool when the present invention is applied and the number of machinings. As can be clearly seen from FIG. 3B, when the present invention is applied, regardless of an increase in the number of machinings, the difference of the lead of the threaded section with respect to the target lead is kept within a fixed range (−3 μm to +3 μm). Therefore, even when the allowable error is set within the range −3 μm to +3 μm, the machined articles satisfy the allowable error in the range of all numbers of machinings. In this way, with the threaded section machining device and machining method of the present invention, regardless of an increase in the amount of thermal expansion of the machined article as the number of machinings increases, the occurrence of variation in the lead of the threaded section that is formed on the machined articles is effectively prevented.

In this example, the next machining conditions are set based on history information for the amount of thermal expansion of the machined articles 19a, so it is not necessary to perform fast and highly precise control as in the case of real-time feedback control. As a result, expensive equipment is not necessary, and it is possible to keep equipment costs and machining costs low.

One embodiment of the present invention has a function of determining the state of the machine tool that is used by comparing the amount of thermal expansion of a machined article 19a with an approximation straight line (refer to the chain line in FIG. 2) that expresses the correlation between the history information for the amount of thermal expansion of the machined article 19a and the number of machinings (machining time). Therefore, by discovering early any abnormalities that occur in the machine tool 14a and replacing the machine tool 14a, continuing machining with a bad machine tool 14a can be prevented, and thus it is possible to maintain good quality threaded sections on the machine articles.

INDUSTRIAL APPLICABILITY

In addition to the case of machining a threaded section on the outer-circumferential surface of a rod-shaped machined article, the present invention can also be applied to the case of forming a male threaded section on the outer-circumferential surface of a tubular-shaped machined article, or the case of forming a female threaded section around the inner-circumferential surface thereof. Moreover, an even larger effect can be obtained when the present invention is applied to a threaded section machining device for performing cutting at a fast speed, or to a threaded section machining device for forming a machined article that is short in the axial direction. However, the present invention can also be widely applied to threaded section machining devices for performing grinding machining, or threaded section machining devices for machining a ball-screw groove on a ball-screw rod of a ball-screw device, or machining a female threaded section around the inner-circumferential surface of a nut. Furthermore, the present invention can also be applied to machining for gradually forming a threaded section having multiple threads on the outer-circumferential surface or inner-circumferential surface of a machined article such as in the case of a so-called multiple thread screw.

EXPLANATION OF REFERENCE NUMBERS

1 Electric motor
2 Housing
3 Worm tooth
4 Worm
5 Worm wheel
6 Ball bearing
7 Output shaft
8 Tooth section
9 Steering shaft
10 First drive device
11 Rotary drive shaft
12 Grip section
13 Measurement
13 Measurement means
14, 14a Machine tool
15 Second drive device
16, 16a Axial feeding device
17, 17a Controller
18 Feeding table
19, 19a Machined article
20 Tailstock
21 Amp
22 Memory device

What is claimed is:

1. A threaded section machining method for forming a threaded section on an outer-circumferential surface of a rod-shaped or tubular shaped machined article by causing relative rotation and relative displacement between the machined article and a machine tool; comprising steps of:
   measuring an amount of thermal expansion in an axial direction of the machined article during machining by a measurement means;
   obtaining history information for the amount of thermal expansion of the machined article that has been machined from the measurement results; and
   setting a speed of relative rotation or a speed of relative displacement for a machined article to be machined next based on the history information for the amount of thermal expansion of the machined article that has been machined;
   wherein, after at least two machined articles have been machined, the threaded section machining method further comprises a step of finding a correlation between the history information for the amount of thermal expansion of the at least two machined articles that have been machined and the number of machinings; and
   the speed of relative rotation or the speed of relative displacement for a machined article to be machined next is set based on the history information for the amount of thermal expansion of the machined article that has been machined and the correlation between the history information for the amount of thermal expansion of the machined articles that have been machined.

2. The threaded section machining method according to claim 1, wherein a state of the machine tool being used is determined by comparing the correlation between the history information for the amount of thermal expansion of the machined articles that have been machined and the number of machinings, and the amount of thermal expansion of the machined article during machining.

3. A threaded section machining device comprising:
- a rotary drive shaft rotated and driven by a first drive device;
- a grip section for concentrically fastening one end of a rod-shaped or tubular-shaped machined article to the rotary drive shaft so as to be able to integrally rotate with the rotary drive shaft;
- a measurement means for measuring an amount of thermal expansion in an axial direction of the machined article during machining;
- a machine tool for machining the machined article;
- an axial feeding device driven by a second drive device and for causing relative displacement in the axial direction between the machine tool and the machined article; and
- a controller for controlling a rotational speed of the rotary drive shaft or a feeding speed of the axial feeding device; and
- the threaded section machining device forming a threaded section around an outer-circumferential surface of the machined article by causing the machined article to rotate by rotating the rotary drive shaft, and causing the machine tool to move in the axial direction relative to the machined article; and
- the controller obtaining history information for an amount of thermal expansion of the machined article being machined from the measurement results, and setting a speed of relative rotation or speed of relative displacement for a machined article to be machined next based on the correlation between the history information for the amount of thermal expansion of the machined article that has been machined;
- wherein, after at least two machined articles have been machined, the threaded section machining method further comprises a step of finding a correlation between the history information for the amount of thermal expansion of the at least two machined articles that have been machined and the number of machinings; and
- the speed of relative rotation or the speed of relative displacement for a machined article to be machined next is set based on the history information for the amount of thermal expansion of the machined article that has been machined and the correlation between the history information for the amount of thermal expansion of the machined articles that have been machined.

4. The threaded section machining device according to claim 3, wherein the controller determines a state of the machine tool being used by comparing the correlation between the history information for the amount of thermal expansion of the machined articles that have been machined and the number of machinings, with the amount of thermal expansion of the machined article during machining.

* * * * *